United States Patent
Schnitter et al.

(10) Patent No.: US 9,112,581 B2
(45) Date of Patent: Aug. 18, 2015

(54) METHOD AND DEVICE FOR DATA PROCESSING IN XDSL SYSTEM

(75) Inventors: Matthias Schnitter, München (DE); Thomas Treyer, München (DE)

(73) Assignee: Adtran GmbH, Berlin-Siemensstadt (DE)

( * ) Notice: Subject to any disclaimer, the term of this patent is extended or adjusted under 35 U.S.C. 154(b) by 623 days.

(21) Appl. No.: 12/680,598

(22) PCT Filed: Sep. 26, 2008

(86) PCT No.: PCT/EP2008/062932
§ 371 (c)(1),
(2), (4) Date: Jun. 15, 2010

(87) PCT Pub. No.: WO2009/040419
PCT Pub. Date: Apr. 2, 2009

(65) Prior Publication Data
US 2010/0254464 A1    Oct. 7, 2010

(30) Foreign Application Priority Data

Sep. 28, 2007   (EP) .................................... 07019204

(51) Int. Cl.
*H04B 3/00* (2006.01)
*H04B 3/32* (2006.01)
(Continued)

(52) U.S. Cl.
CPC .. *H04B 3/32* (2013.01); *H04L 5/14* (2013.01); *H04K 1/10* (2013.01); *H04L 5/0042* (2013.01); *H04L 5/1438* (2013.01); *H04L 12/12* (2013.01); *H04L 25/03012* (2013.01);
(Continued)

(58) Field of Classification Search
CPC ........ H04B 3/32; H04L 12/12; H04L 5/0042; H04L 5/1438; H04L 69/24; H04L 2025/03414; H04L 25/03012; H04L 5/14; H04M 11/062; H04K 1/10
USPC .......................... 375/219, 220, 222, 231, 257
See application file for complete search history.

(56) References Cited

U.S. PATENT DOCUMENTS 6,970,560 B1 *  11/2005  Hench et al. .................. 379/417
7,747,789 B2      6/2010  Zhou
(Continued)

FOREIGN PATENT DOCUMENTS

CN      1855917 A      11/2006
WO      0135609 A1      5/2001

OTHER PUBLICATIONS

ITU-T G.992.1: "Series G: Transmission Systems and Media, Digital Systems and Networks", Asymmetric Digital Subscriber Line (ADSL) Transceivers, International Telecommunication Union, Jun. 1999, Geneva, Switzerland.
(Continued)

*Primary Examiner* — Shuwang Liu
*Assistant Examiner* — Ross Varndell
(74) *Attorney, Agent, or Firm* — Laurence A. Greenberg; Werner H. Stemer; Ralph E. Locher

(57) ABSTRACT

A method and a device for data processing between a first network element connected via several lines to several second network elements. The method includes the following steps: (i) if a line is trained, at least one other line is switched to a first mode; and (ii) if the line has been trained, the at least one other line is free to switch to a second mode.

16 Claims, 3 Drawing Sheets

(51) Int. Cl.

| | |
|---|---|
| H04L 5/00 | (2006.01) |
| H04L 25/03 | (2006.01) |
| H04L 12/12 | (2006.01) |
| H04M 11/06 | (2006.01) |
| H04K 1/10 | (2006.01) |
| H04L 29/06 | (2006.01) |
| H04L 5/14 | (2006.01) |

(52) U.S. Cl.
CPC ...... *H04L 69/24* (2013.01); *H04L 2025/03414* (2013.01); *H04M 11/062* (2013.01)

(56) References Cited

U.S. PATENT DOCUMENTS

| | | | |
|---|---|---|---|
| 2006/0029148 A1* | 2/2006 | Tsatsanis | 375/267 |
| 2009/0022214 A1* | 1/2009 | Locke | 375/222 |

OTHER PUBLICATIONS

ITU-T G.992.3: Series G: Transmission Systems and Media, Digital Systems and Networks, Asymmetric Digital Subscriber Line 2 (ADSL2), International Telecommunication Union, Jan. 2005, Geneva, Switzerland.

ITU-T G.992.5: Series G: "Transmission Systems and Media, Digital Systems and Networks", Asymmetric Digital Subscriber Line (ADSL) Transceivers—Extended Bandwidth ADSL2 (ADSL2+), International Telecommunication Union, Jan. 2005, Geneva, Switzerland.

ITU-T G.993.1: Series G: "Transmission Systems and Media, Digital Systems and Networks", Very High Speed Digital Subscriber Line Transceivers, International Telecommunication Union, Jun. 2004, Geneva, Switzerland.

ITU-T G.993.2: Series G: "Transmission Systems and Media, Digital Systems and Networks", Very High Speed Digital Subscriber Line Transceivers 2 (VDSL2), International Telecommunication Union, Feb. 2006, Geneva, Switzerland.

* cited by examiner

FIG. 2

|  | Training during: Adjacent nodes are in L0 mode | Training during: Adjacent nodes are in L2 mode |
|---|---|---|
| Static SNR margin configuration (relates to configuring a larger SNR margin) | Data rate smaller (201) | Data rate normal (202) |
| Approach provided | Data rate normal (203) | Case does not exist (204) |

# METHOD AND DEVICE FOR DATA PROCESSING IN XDSL SYSTEM

BACKGROUND OF THE INVENTION

Field of the Invention

DSL (Digital Subscriber Line) is a family of technologies that provide digital data transmission over the wires of a telephone access network. DSL technologies are often referred to as "xDSL", wherein "x" stands for various DSL variants.

Asymmetric Digital Subscriber Line (ADSL, ITU-T G.992.1) is a form of DSL, a data communications technology that enables faster data transmission over copper telephone lines than a conventional voice band modem can provide. Such fast transmission is achieved by utilizing frequencies that are normally not used by a voice telephone call, in particular, frequencies higher than normal human hearing.

ADSL2 (ITU-T G.992.3) and ADSL2plus (ITU-T G.992.5) are variants of ADSL, both providing better performance compared to basic ADSL.

VDSL (Very high speed DSL, ITU-T G.993.1) as well as VDSL2 (Very high speed DSL 2, ITU-T G.993.2) are xDSL technologies providing even faster data transmission over a single twisted pair of wires. This is mainly achieved by using a larger frequency range.

xDSL technologies exploit the existing infrastructure of copper wires that were originally designed for plain old telephone service (POTS). They can be deployed from central offices (COs), from, e.g., fiber-fed cabinets preferably located near the customer premises, or within buildings.

Transmission of signals across a copper access network may cause crosstalk problems.

Copper access networks often are designed such that they utilize cables containing a multitude of wires or wire pairs. Wires or wire pairs are often organized in binders within cables.

Wires or wire pairs are running in parallel with other wires or wire pairs over significant distances.

Crosstalk occurs when wires are coupled, in particular between wire pairs (twisted pair lines) of the same or a nearby binder within the same or an adjacent cable. Hence, data signals from one or more twisted pair lines can be superimposed on and contaminate a data signal of a different twisted pair line. The crosstalk comprises a near-end crosstalk (NEXT) and a far-end crosstalk (FEXT).

Based on such crosstalk, data signals transmitted over twisted-pair lines can be considerably degraded by the crosstalk interference generated on one or more adjacent twisted-pair phone lines in the same and/or a nearby cable or binder. With an increasing transmission speed, this problem even deteriorates. Crosstalk may significantly limit a maximum data rate to be transmitted via a single line.

FIG. 1 illustrates in particular crosstalk comprising NEXT and FEXT components between a Central Office (CO) comprising several transceivers $CO_0$ to $CO_N$ and several Customer Premises Equipment transceivers $CPE_0$ to $CPE_N$ located at different customer locations. CO and CPE transceivers may be connected via a common Cable Binder.

The impact of NEXT can be reduced and/or eliminated by utilizing different frequency bands for upstream and downstream directions of transmission. A remaining crosstalk is then mainly based on FEXT.

In ADSL2 and ADSL2plus, saving of transmission power can be achieved by an "L2 mode" that allows reducing the power for transmission when the payload data rate which is to be transmitted falls below a predetermined threshold. When the data rate exceeds a certain threshold, transceivers switch back to an "L0 mode" (full power mode).

However, operators dislike using said L2 mode in their networks, because it results in significant crosstalk and/or interference issues.

A "Signal-to-Noise Ratio (SNR) margin" represents the amount of increased received noise power (in dB) relative to the noise power that the system is designed to tolerate, wherein it still meets the target bit error rate of $10^{-7}$.

A "training" refers to the first phase of setting up the communication link between two DSL transceivers. During a training phase, the transceivers at both ends of the line exchange their capabilities and negotiate a set of parameters.

As switching from L2 mode into L0 mode leads to significant non-stationary crosstalk, solutions are required to cope with such crosstalk.

Reference is made to FIG. 1 showing a line 101 connecting the Central Office with $CPE_0$ and a line 102 connecting the Central Office with $CET_1$.

With line 101 running in L2 mode, it produces only little crosstalk into line 102 due to its low transmission power. When $CO_1$ and $CPE_1$ transceivers perform training, they see a high SNR margin. They adapt themselves to such good line conditions.

When line 101 switches to L0 mode, its crosstalk into line 102 suddenly increases, i.e., the SNR margin on line 102 rapidly drops. In a worst case scenario, the connection on line 102 crashes and retraining of $CO_1$ and $CPE_1$ becomes necessary. Such retraining leads to an interruption of the service and shall be avoided.

Switching into L2 mode and from L2 mode to L0 mode may happen at a rate of less than one second, depending on data bursts. Accordingly, connection crashes of adjacent lines may occur not only once every few hours but at a tremendously higher rate thus leading to an instable overall network.

A solution to overcome these disadvantages is to disable Power Saving (L2) mode. This, however, comes at the cost of a high overall power consumption.

BRIEF SUMMARY OF THE INVENTION

The problem to be solved is to overcome the disadvantages as set forth above and in particular to provide an efficient and stable approach to utilize a power saving mode in a DSL environment.

This problem is solved according to the features of the independent claims. Further embodiments result from the depending claims.

In order to overcome this problem, a method is provided for data processing between a first network element being connected via several lines to several second network elements comprising the steps:

- if a line is trained, at least one other line is switched to a first mode;
- if the line has been trained, the at least one other line is free to switch to a second mode.

In particular, the first network element comprises several sub-network elements, each being connected to a second network element. Advantageously, each sub-network element is connected via a line to a second network element. In particular, a line comprises a twin-wire line.

The training of a line may be directed towards setting up a communication link between two transceivers, each at either end of the line, wherein the transceivers may be (x)DSL transceivers.

The first mode may in particular be a mode of high power and/or full power. In such case, the training takes into consideration a significant or high amount of interference thus allowing the transceivers to adjust to a data rate that can be maintained during operation.

It is to be noted that if the line has been trained, the at least one other line may maintain the first mode, e.g., a full power mode, and does not have to switch to the second mode.

In an embodiment, the first network element is or is associated with a Central Office (CO) and/or a Digital Subscriber Line Access Multiplexer (DSLAM).

In another embodiment, the several lines are Digital Subscriber Lines, in particular Asymmetric Digital Subscriber Lines according to ADSL2/2plus standards or Very high speed Digital Subscriber Lines according to VDSL/VDSL2 standards.

In a further embodiment, training of a line comprises setting up a communication link between two transceivers.

In a next embodiment, the transceivers at both ends of the line exchange their capabilities and negotiate a setting of parameters.

It is also an embodiment that the second network element is a Customer Premises Equipment (CPE).

Pursuant to another embodiment, the first mode corresponds to a full power mode.

According to an embodiment, the second mode comprises at least one mode of reduced power.

The second mode may in particular comprise several modes of reduced power (i.e. not full power), wherein the several modes may differ gradually.

According to another embodiment, the at least one other line that is switched to the first mode is locally associated with the line to be trained. In particular, the at least one other line may be locally associated within a cable binder with the line to be trained.

In yet another embodiment, the first network element switches the at least one other line to the first mode.

According to a next embodiment, the first network element comprises several distributed first network elements, wherein one of the distributed first network elements communicates the training of one of its lines to the at least one other distributed first network element, the latter switching at least one of its lines to the first mode.

Hence, a first DSLAM may communicate to a second DSLAM that training of one of its lines is due. The first DSLAM and the second DSLAM both switch their lines to the first mode. This is in particular useful if the first DSLAM and the second DSLAM share lines of at least one cable binder.

This concept applies in a similar manner to more than two DSLAMs or to several Central Offices. However, if the (distributed) network elements know which lines are put together in a binder, they may specifically switch those lines to the first mode that are put together in a binder with the line to be trained, because these lines may inflict significant crosstalk on the line in training.

The problem stated supra is also solved by a device for data processing comprising a processor unit that is equipped/arranged such that the method as described is executable on said processor unit.

According to an embodiment, the device is a communication device, in particular a network element. Said device may in particular be or be associated with a Central Office (CO) and/or a Digital Subscriber Line Access Multiplexer (DSLAM).

The problem stated above is also solved by a communication system comprising the device as described herein.

Embodiments of the invention are shown and illustrated in the following figures:

BRIEF DESCRIPTION OF THE SEVERAL VIEWS OF THE DRAWING

FIG. 2 shows a table visualizing data rates that can be achieved by utilizing different SNR margin setting options;

DESCRIPTION OF THE INVENTION

According to the approach provided herewith adjacent lines may be connected to at least one DSLAM or to at least one line card in a Central Office (CO).

This DSLAM is aware of which lines are currently in a training mode, which lines are currently in a full power mode (L0 mode) and which lines are in a reduced power mode (L2 mode).

The DSLAM (and/or the CO) may be supplemented such that they are able to execute the following steps:

When a line starts its training phase, at least some other lines, in particular adjacent lines, are switched to the full power mode (L0 mode) irrespective of their current status or use. Optionally, all other lines may be switched to the full power mode (L0 mode).

If or when the training of the particular line is finished, the remaining lines may return to their respective previous modes.

This approach may be applied to a single line card or to a complete DSLAM with multiple line cards.

There are in particular two options after the training phase of a specific line: The other lines may return from the full power mode (L0 mode) to the mode they had before or they can go through an automatic selection of power management modes.

Figure 1:
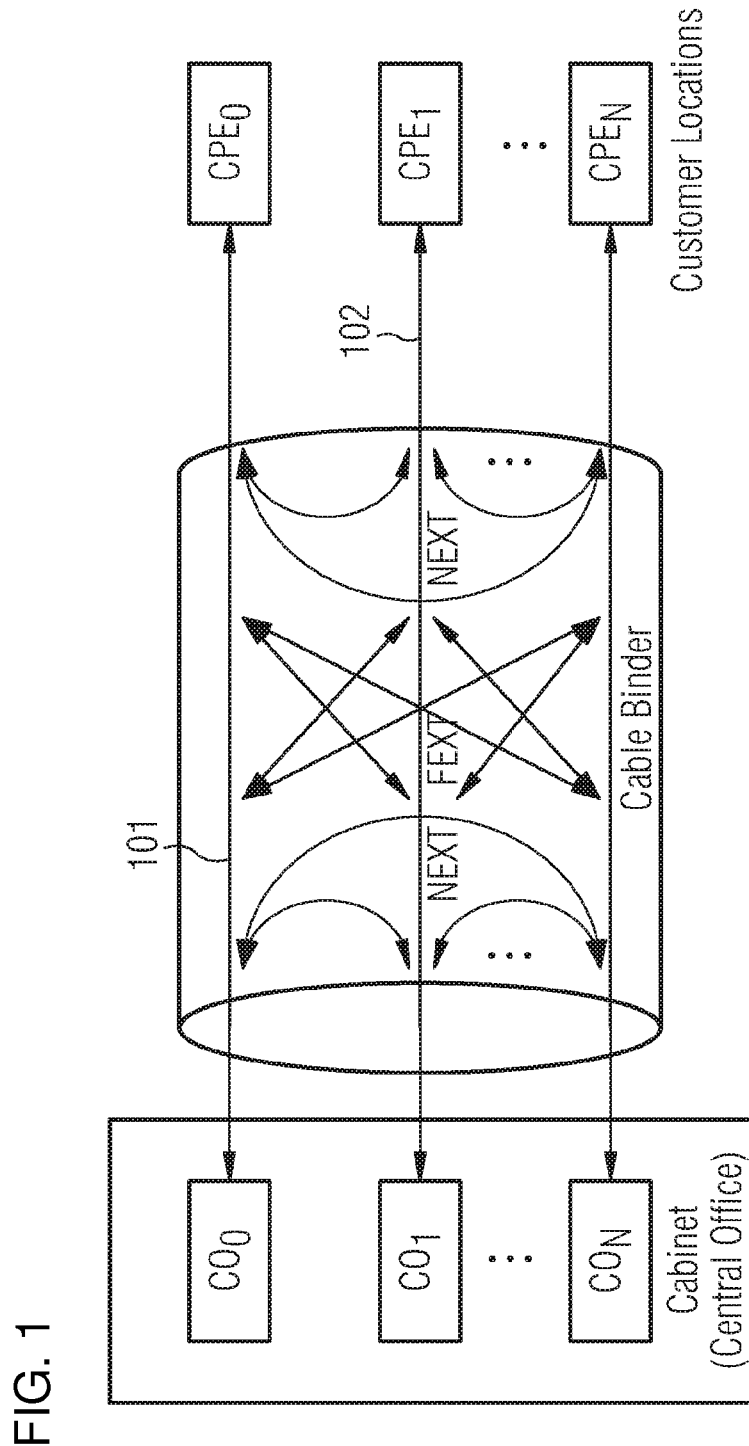
Figure 3:
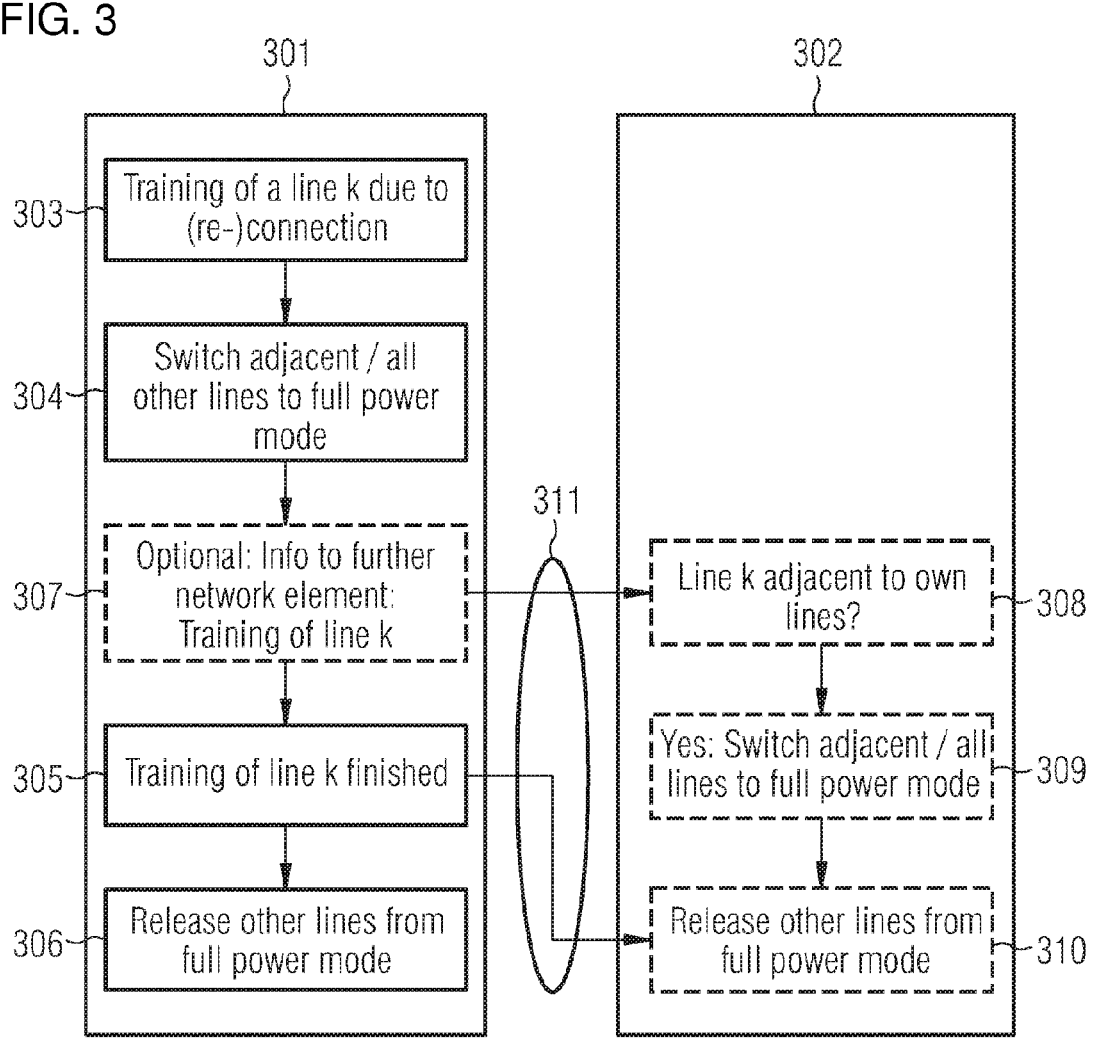
FIG. 3 shows steps of a method to be run on a device, e.g., a DSLAM, that allow an efficient utilization of a DSL power management.

Steps of the method that may in particular be run on a DSLAM, at a CO or in a line card are depicted in FIG. 3.

FIG. 3 shows a first DSLAM 301 and a second DSLAM 302. The second DSLAM 302 may also comprise the functionality of the first DSLAM 301, but regarding this example the second DSLAM 302 may be triggered by the first DSLAM 301 via at least one communication channel 311.

It is to be noted that each component 301 and 302 may be realized also as a CO or as a line card at the CO or of the DSLAM. It is also noted that several such second DSLAMs 302 may be provided that can be triggered by said first DSLAM 301.

In a step 303 a training of a particular line k is conducted, e.g., due to a connection or re-connection of the DSL modem. As stated supra, the training may in particular comprise setting up the communication link between two DSL transceivers, one being located at the DSLAM 301, the other at the CPE. During training, the transceivers at both ends of the line exchange their capabilities and negotiate a set of parameters.

In order to achieve an efficient training result regarding potential crosstalk effects from adjacent lines (in particular lines that are in the same cable binder with said line k), training of line k is conducted when all other lines are in full power mode (see step 304). As an option, training of said line k may be conducted when a selection of other lines is switched to the full power mode. Such selection may comprise lines that are adjacent to one another and in particular are adjacent to the line k and hence inflict significant crosstalk to the line k during training.

When training of line k is finished (step 305), the other lines (adjacent lines) are free to switch to a different mode other than the full power mode, in particular to a mode of reduced power to enable power management (step 306). Of course, at least one of the other lines may remain in said full power mode.

As an option, the DSLAM 301 may indicate to the DSLAM 302 the training of said line k (see step 307). This is in particular useful if lines of the same cable binder are attached to ports of the first DSLAM 301 and to ports of the second DSLAM 302.

As a further option, the DSLAM 302 may check in a step 308 whether line k (attached to DSLAM 301) has adjacent lines that are attached to said DSLAM 302 and in the affirmative, the DSLAM 302 may switch all its lines that are adjacent to line k (or generally all its lines) to full power mode (in step 309).

The end of training of the line k is indicated by step 305 and such information may be conveyed to the DSLAM 302 in order to release the lines previously set to full power mode (step 310). Hence, the lines attached to the DSLAM 302 are free to adopt a different power management mode.

Further Advantages:

The concepts can be implemented by modification of the DSLAM only. No change is required at the CPEs.

The L2 mode, in particular as specified by ADSL2/2plus, can actually be used. Operators do not face the risk of an instable network. Hence, power saving mechanisms are efficiently applicable.

Because training is conducted under noisy circumstances (severe crosstalk and/or interference), in particular by applying a worst case scenario of utmost crosstalk conditions, no spare SNR margin is required or has to be set up.

The table of FIG. 2 shows which data rates can be achieved by utilizing different SNR margin setting options.

Cases 201 and 202 refer to a static SNR margin configuration that may be needed in order to anticipate a worst case scenario that may otherwise not be covered during training of a particular line. If during training of a particular line a significant number of adjacent lines are in L2 mode, a normal data rate (target data rate) is achieved (case 202). However, if a number of adjacent lines are in L0 mode during such training (case 201), the achievable data rate is smaller than the normal target data rate.

The approach provided herein significantly improves the data rate that can be utilized (see cases 203 and 204): Training is conducted under noisy conditions, in particular under worst case conditions by inflicting crosstalk from adjacent lines that are in the full power mode (L0 mode) during said training. Hence, no spare SNR margin above the target SNR margin is required to anticipate the case of adjacent lines switching to full power mode (L0 mode) thereby producing higher crosstalk during operation.

Transceivers can adapt themselves such that a necessary target SNR margin is just reached, but not exceeded. So, the data rate that can be utilized corresponds to the normal (target) data rate.

The invention claimed is:

1. A data transmission method, comprising:
providing a first network element connected through a plurality of lines to a plurality of second network elements;
transmitting the data via the lines in a full power mode or a mode with reduced transmission power;
when a line is to be trained, switching at least one other line to the full power mode; and
when the line has been trained, allowing the at least one other line to switch to the mode with reduced transmission power
wherein the at least one other line is locally associated with the line to be trained in a cable binder;
wherein the first network element includes several distributed first network elements and wherein one of the distributed first network elements communicates the training of one of its lines to the at least one other distributed first network element, whereupon the at least one other distributed first network element switches at least one of its lines to the full power mode;
wherein at least the first network element is configured as, or associated with, a central office and/or a digital subscriber line access multiplexer.

2. The method according to claim 1, wherein the first network element is, or is associated with, a central office and/or a digital subscriber line access multiplexer.

3. The method according to claim 1, wherein the lines are digital subscriber lines.

4. The method according to claim 3, wherein the lines are asymmetric digital subscriber lines according to ADSL2/2plus standards or very high speed digital subscriber lines according to VDSL/VDSL2 standards.

5. The method according to claim 1, wherein training of a line comprises setting up a communication link between two transceivers.

6. The method according to claim 5, which comprises, during training, transceivers at both ends of a line exchange their capabilities and negotiate a setting of parameters.

7. The method according to claim 1, wherein the second network element is a customer premises equipment.

8. The method according to claim 1, wherein the at least one other line that is switched to the full power mode is locally associated with the line to be trained.

9. The method according to claim 1, which comprises switching the at least one other line to the full power mode with the first network element.

10. The method according to claim 1, wherein the data transmission utilizes power saving modes.

11. The method according to claim 10, wherein power saving modes are configured for copper wires.

12. A data processing device, comprising a processor unit with a processor programmed to execute the method according to claim 1 on said processor unit.

13. The device according to claim 12, configured as a communication device.

14. The device according to claim 12, configured as a network element.

15. A communication system, comprising a data processing device with a processor unit having a processor programmed to execute the method according to claim 1 on said processor unit.

16. A data transmission method, comprising:
providing a first network element connected through a plurality of lines to a plurality of second network elements, each of the plurality of lines being switchable between a full power mode and a reduced transmission power mode;
transmitting the data via the lines in at least one of the full power mode or the reduced transmission power mode;
when a line is to be trained, switching at least one other line to the full power mode; and
when the line has been trained, allowing the at least one other line to switch to the mode with reduced transmission power wherein the at least one other line is locally associated with the line to be trained in a cable binder;

wherein the first network element includes several distributed first network elements and wherein one of the distributed first network elements communicates the training of one of its lines to the at least one other distributed first network element, whereupon the at least one other distributed first network element switches at least one of its lines to the full power mode; and wherein at least the first network element is configured as, or associated with, a central office and/or a digital subscriber line access multiplexer.

* * * * *